(12) United States Patent
Vetrovec et al.

(10) Patent No.: US 7,310,360 B2
(45) Date of Patent: Dec. 18, 2007

(54) APPARATUS AND METHOD FOR FACE COOLING OF OPTICAL COMPONENTS OF A LASER SYSTEM

(75) Inventors: Jan Vetrovec, Thousand Oaks, CA (US); William C Elliott, Reseda, CA (US)

(73) Assignee: The Boeing Company, Chicago, IL (US)

( * ) Notice: Subject to any disclaimer, the term of this patent is extended or adjusted under 35 U.S.C. 154(b) by 456 days.

(21) Appl. No.: 10/973,072

(22) Filed: Oct. 25, 2004

(65) Prior Publication Data

US 2006/0088067 A1   Apr. 27, 2006

(51) Int. Cl.
*H01S 3/04* (2006.01)
(52) U.S. Cl. ........................................ 372/36
(58) Field of Classification Search ............ 372/34–36; 257/678–707
See application file for complete search history.

(56) References Cited

U.S. PATENT DOCUMENTS

| | | | |
|---|---|---|---|
| 3,579,142 A | 5/1971 | Smiley | |
| 3,631,362 A | 12/1971 | Almasi et al. | |
| 4,029,400 A | 6/1977 | Eitel | |
| 4,084,883 A | 4/1978 | Eastman et al. | |
| 4,175,834 A | 11/1979 | Sigman et al. | |
| 4,357,704 A | 11/1982 | Koechner | |
| 4,657,358 A | 4/1987 | Anthony et al. | |
| 4,837,771 A | 6/1989 | Baer | |
| 4,849,036 A | 7/1989 | Powell et al. | |
| 4,876,694 A | 10/1989 | Hughes | |

(Continued)

FOREIGN PATENT DOCUMENTS

DE   4239653   6/1994

(Continued)

OTHER PUBLICATIONS

Proceedings of the SPIE—The International Society for Optical Engineering SPIE—Int. Soc. Opt. Eng USA, Vetrovec, J.; "Compact active Mirror Laser (CAMIL)"; vol. 4630, 2002, pp. 1-12, XP002310313.

(Continued)

*Primary Examiner*—Minsun Oh Harvey
*Assistant Examiner*—Xinning (Tom) Niu
(74) *Attorney, Agent, or Firm*—Harness, Dickey & Pierce, P.L.C.

(57) ABSTRACT

A cooling system for use in with a transmissive optical element of a high average power laser (HAP). The system includes at least one optically transmissive element (TOC) that is held by a differential pressure in thermal contact with a heat sink assembly. In one embodiment, the heat sink assembly includes an optically transparent heat conductor (THC) attached to at least one face of the TOC. A vacuum formed between adjacent faces of the TOC and THC urges the facing planar surfaces into thermal contact with one another. Waste heat generated in the TOC is conducted to the THC. The temperature gradient inside the TOC is maintained substantially parallel to the direction of a laser beam being directed through the THC so that a given phase front of the beam exposes TOC material to the same temperature. As a result, the TOC does not perturb the phase front of the laser beam.

23 Claims, 6 Drawing Sheets

U.S. PATENT DOCUMENTS

| | | | |
|---|---|---|---|
| 4,944,580 A | 7/1990 | MacDonald et al. | |
| 5,335,237 A | 8/1994 | Zapata | |
| 5,363,391 A | 11/1994 | Matthews et al. | |
| 5,400,173 A | 3/1995 | Komine | |
| 5,425,044 A | 6/1995 | Schlie et al. | |
| 5,441,803 A | 8/1995 | Meissner | |
| 5,553,088 A | 9/1996 | Brauch et al. | |
| 5,563,899 A | 10/1996 | Meissner et al. | |
| 5,579,333 A | 11/1996 | Neil et al. | |
| 5,610,751 A | 3/1997 | Sweeney et al. | |
| 5,661,738 A | 8/1997 | Yasui et al. | |
| 5,689,522 A * | 11/1997 | Beach | 372/75 |
| 5,699,372 A | 12/1997 | Okazaki | |
| 5,703,893 A | 12/1997 | Komiyama et al. | |
| 5,796,761 A | 8/1998 | Injeyan et al. | |
| 5,812,570 A * | 9/1998 | Spaeth | 372/36 |
| 5,832,015 A | 11/1998 | Goto et al. | |
| 5,846,638 A | 12/1998 | Meissner | |
| 5,856,996 A | 1/1999 | Durkin et al. | |
| 5,872,803 A | 2/1999 | Mori et al. | |
| 5,872,804 A | 2/1999 | Kan et al. | |
| 5,875,206 A | 2/1999 | Chang | |
| 5,903,583 A | 5/1999 | Ullman et al. | |
| 5,936,984 A | 8/1999 | Meissner et al. | |
| 5,978,407 A | 11/1999 | Chang et al. | |
| 6,055,260 A | 4/2000 | Byren et al. | |
| 6,192,061 B1 | 2/2001 | Hart et al. | |
| 6,330,256 B1 | 12/2001 | Byren et al. | |
| 6,339,605 B1 * | 1/2002 | Vetrovec | 372/35 |
| 6,625,193 B2 | 9/2003 | Vetrovec | |
| 2002/0097769 A1 * | 7/2002 | Vetrovec | 372/75 |
| 2002/0172253 A1 | 11/2002 | Vetrovec | |
| 2003/0165172 A1 * | 9/2003 | Maurer et al. | 372/50 |

FOREIGN PATENT DOCUMENTS

| | | |
|---|---|---|
| EP | 0078654 | 10/1982 |
| EP | 1231682 | 8/2002 |
| EP | 1480299 | 11/2004 |

OTHER PUBLICATIONS

Vetrovec, et al.; "Solid-State Disk Laser for High-Average Power"; vol. 5120; Aug. 25, 2002; XP002310314Proc Spie Int. Soc Opt Eng; Proceedings of SPIE—The International Society for Optical Engineering; pp. 731-734; Nov. 2003.

"Development of solid-state disk laser for high-average power";Proceedings of the SPIE—The International Society for Optical Engineering SPIE-Int. Soc. Eng USA, vol. 4968, Jun. 2003, pp. 54-64, XP002310315; ISSN 0277-786X.

"Diode Edge-Pumped Microchip Composite YB: YAG Laser"; Japanese Journal of Applied Physics, Publication Office Japanese Journal of Applied Physics, Tokyo, JP, vol. 41, No. 6A, part 2, Jun. 1, 2002, pp. L606-L608.

Kelly, J H et al, "High-Repitition Rate CR:ND;GSGG Active-Mirror Amplifier" Optics Letters; Optical Society of America, Washington, US vol. 12, No. 12, Dec. 1987, pp. 996-998, XP002069938.

Zapata, Luis et al.; "Composite Thin-Disk Laser Scaleable to 10 kW Average Power Output and beyond"; Lawrence Livermore National Laboratory, 5 pages.

Anderson, S.G.; "Review and forecast of laser markets Part 1: Nondiode lasers"; pp. 92-99; Jan. 2000.

Hugel, H. et al.; "Solid State Thin Disc Laser"; SPIE vol. 3574.

Department of Defense—Report of the High Energy Laser Executive Review Panel entitled "Department of Defense Laser Master Plan" dated Mar. 24, 2000.

Vetrovec, J., "Active Mirror Amplifier for High-Average Power," Proceedings of SPIE, vol. 4270, Jan. 23, 2001, pp. 45-55.

* cited by examiner

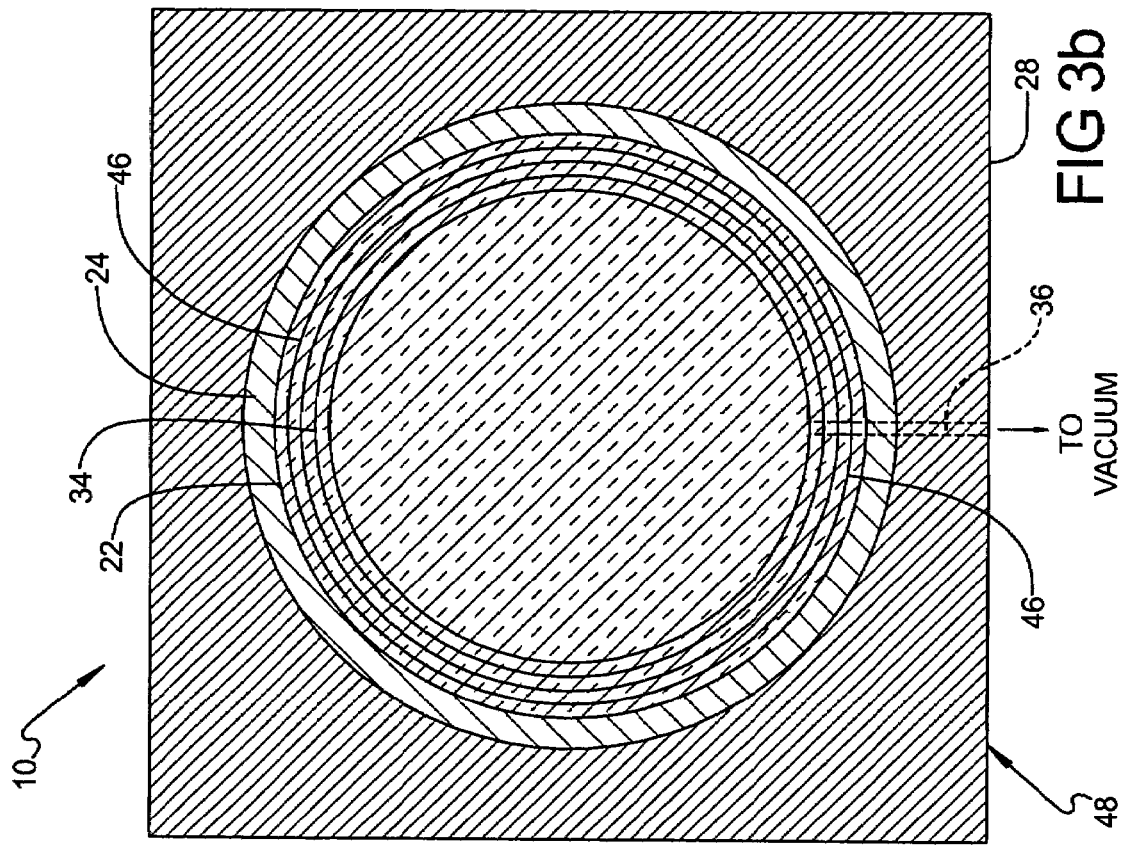
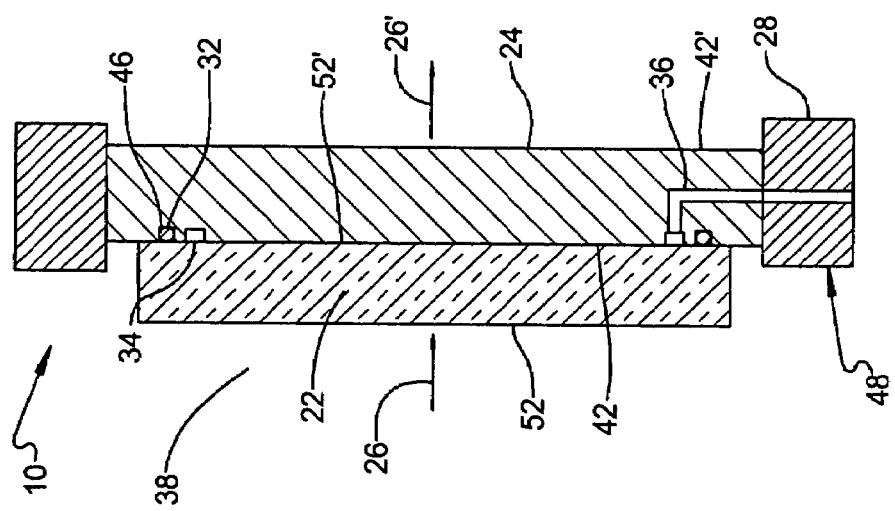

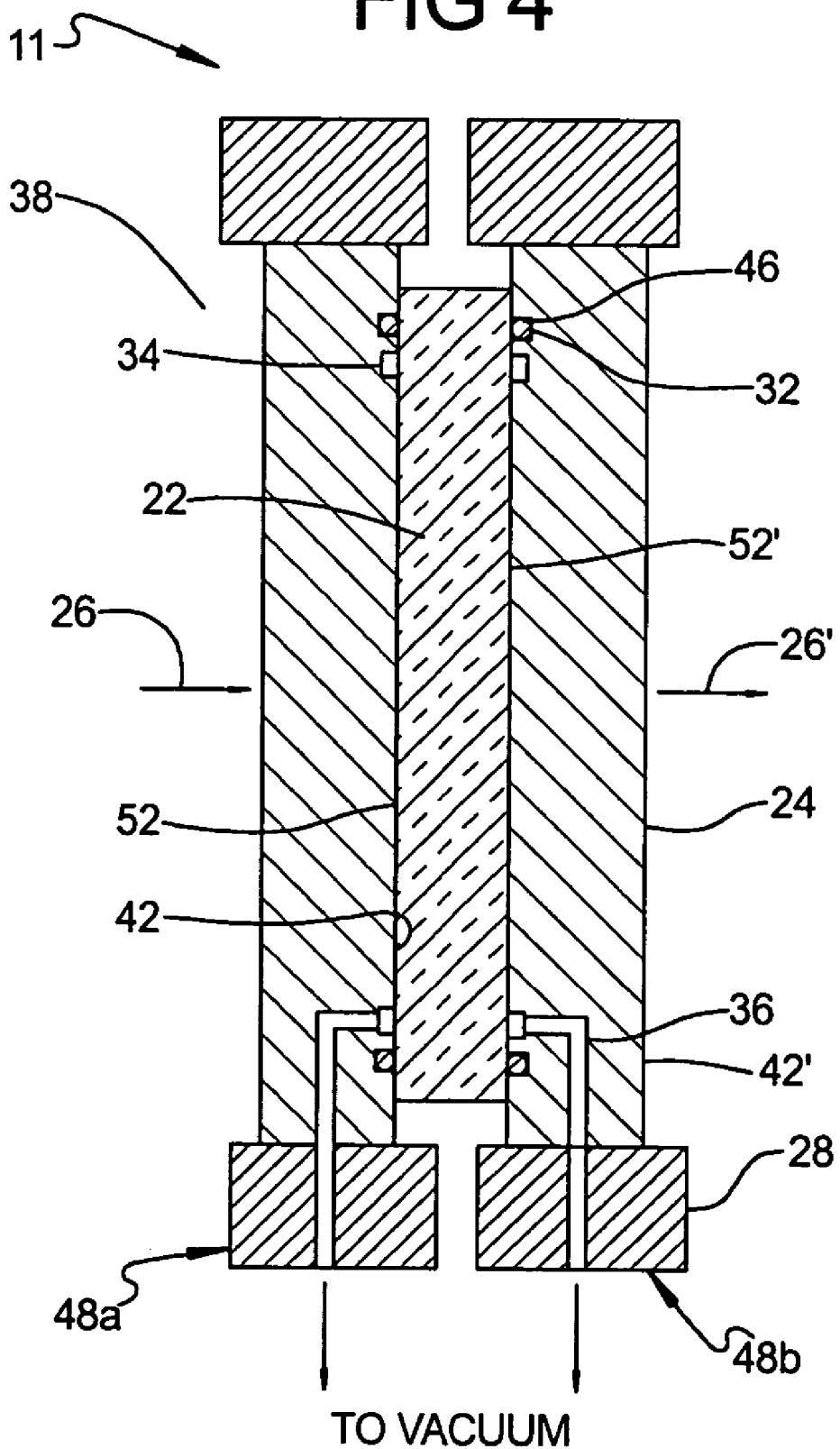

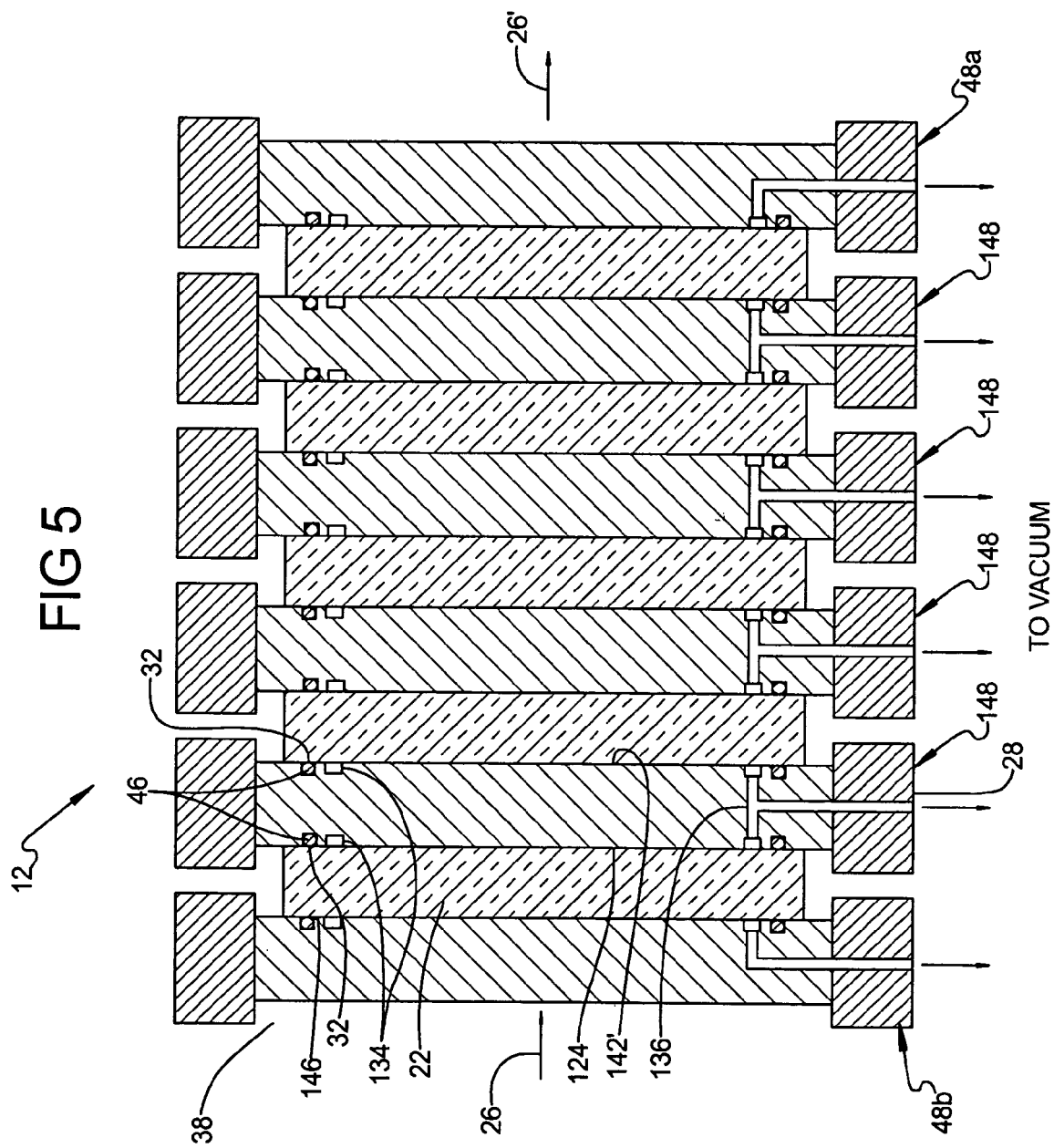

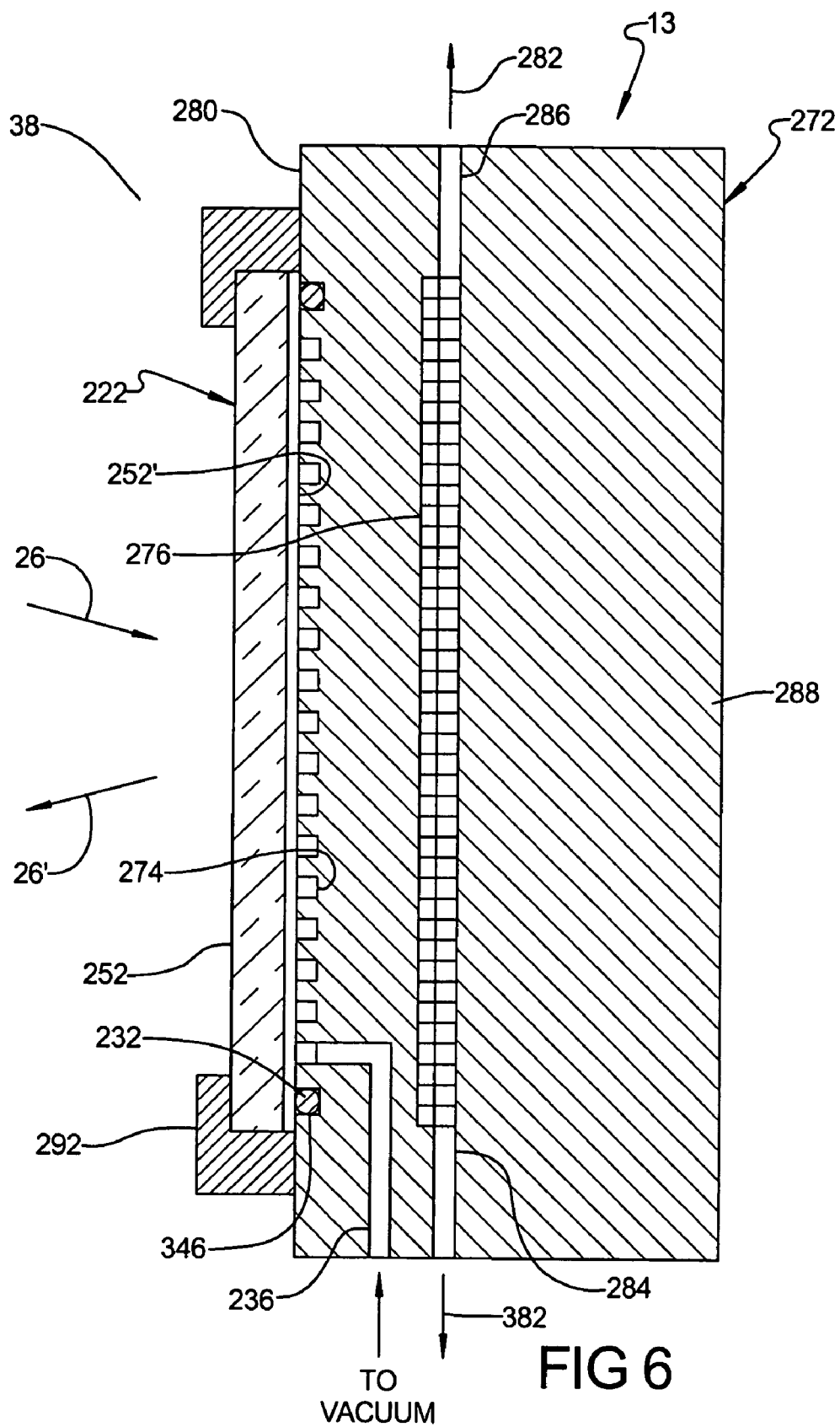

APPARATUS AND METHOD FOR FACE COOLING OF OPTICAL COMPONENTS OF A LASER SYSTEM

FIELD OF THE INVENTION

The present invention relates generally to cooling techniques for optical elements employed in laser systems, and more particularly, to conductive face-cooled optical elements for use in optical systems which are required to process/handle the output of High Average Power (HAP) laser systems.

BACKGROUND OF THE INVENTION

Overview

Transmissive optical components used in high-average power (HAP) lasers experience significant heat load due to absorption of optical energy and other processes. This heat must be removed (often in real time) for the transmissive optical component to operate correctly and efficiently. For example, the process of frequency conversion in a nonlinear laser material generates heat within the nonlinear material medium due to absorption. This heat must be removed if the frequency converter is to operate efficiently at a significant power level. Also, the process of storing energy in a solid state laser amplifier material also generates heat within the laser medium that must be removed, especially if the amplifier is to operate at a significant input power. Other transmissive optical components subjected to heat load and requiring cooling include crystals used in Pockels cells and glass used in Faraday rotators.

Traditional Methods of Heat Removal

A traditional method of heat removal from solid state crystalline materials employed in laser systems is to remove the heat from the sides of the materials, in a direction transverse to the direction of laser energy propagation. The removal of heat in a transverse direction causes thermal gradients in this direction. This creates several problems. In general, temperature gradients generate thermal-optical stress and index variations, which in turn cause thermal aberrations that distort the laser beam. More specifically, in most frequency conversion materials, the temperature variation in a direction transverse to the direction of propagation of the laser beam must be maintained to within a very small tolerance range. The presence of a thermal gradient in this direction severely limits the aperture size and the power loading allowed in a laser system design. Transverse cooling is described in a paper entitled "The Potential of High-Average-Power Solid State Lasers," by J. L. Emmett et al., Document No. UCRL-53571, dated Sep. 25, 1984, available from the National Technical Information Service, and hereby incorporated by reference into the present application.

Conventional beam shaping techniques have been used to cool crystals whereby the laser beam is optically flattened in one transverse direction. This allows the crystal to be cooled along a greater length, and reduces the path from the center of the beam to the edge of the crystal where it is cooled. However, this method is not practical in all applications and requires a relatively high degree of complexity in the associated optics.

In some crystalline materials, and in particular beta-barium borate (BBO), the direction of greatest thermal conductivity in the material is also aligned closely with the direction of optical propagation. In order to efficiently remove heat from materials with this property, the heat must therefore be removed from the optical faces. One method of face cooling is a convective process, normally achieved using a flowing gas. In this method a gas is forced at high velocity across the faces of the crystal. The chief disadvantage of this method is that it requires a complex, active cooling system, and is therefore less suitable for applications requiring low cost, weight and volume, and a high degree of reliability. Also the engineering to implement this method is complex because the gas flow across the optical surfaces must be very uniform to avoid optical distortion.

U.S. Pat. No. 5,363,391, entitled "Conductive Face-Cooled Laser Crystal", and issued to Steven C. Matthews et al on Nov. 8, 1994 and hereby incorporated by reference, discloses and claims techniques for passively removing heat from an optical element in a laser system through its optically transmissive faces (FIG. 1). Heat is removed by way of optically transmissive heat conducting media disposed adjacent the optically transmissive surfaces of the optical element. Heat is transferred out of the optical element in a direction parallel to the direction of propagation of optical radiation, thus minimizing problems associated with thermal gradients. Devices employing optical elements such as nonlinear frequency conversion crystals and laser crystals may utilize this heat management approach to achieve better performance. Heat is transferred to the heat conducting media by direct contact or through narrow gas-filled gaps disposed between the optical element and the heat conducting media.

U.S. Pat. No. 6,330,256, entitled "Method and apparatus for non-dispersive face-cooling of multi-crystal nonlinear optical devices", and issued to Robert W. Byren et, al on Dec. 11, 2001 and incorporated by reference herein, teaches how to use the face-cooling method taught in U.S. Pat. No. 5,363,391 with multiple nonlinear crystal formats used primarily for second harmonic generation without the need for air-path rephasing between the crystals (FIG. 2). One or more birefringent crystals are cut and oriented such that there is no dispersion between the fundamental and second harmonic wavelengths within each crystal. The birefringent crystals are then disposed in a heat-conducting housing, sandwiched between two or more nonlinear crystals and used as the face-cooling medium. The multiple crystal assembly may be further sandwiched between optically transmissive windows which need not be birefringent or non-dispersive, these windows being used to protect the outermost nonlinear crystals and/or provide additional face cooling. This causes the heat generated in the nonlinear crystals by absorption at the fundamental and second harmonic wavelengths to flow longitudinally (direction of beam propagation) into the face-cooling medium, thereby minimizing any transverse thermal gradient in the nonlinear crystals and the attendant dephasing loss. The crystals can be dry stacked with a very small gas-filled gap as taught in U.S. Pat. No. 5,363,391, immersed in a liquid or gel of suitable refractive index, bonded with suitable optical cement, optically contacted, or diffusion-bonded together to form a composite crystal.

The above-described systems and methods rely on heat transfer from the transmissive optical component to a heat sink by means of conduction due to a mechanical contact, optical contact, bonded joint, or a narrow gas-filled gap. It is well known, however, that transmissive optical components exposed to thermal load tend to warp significantly. Unless an external force is provided, the effective contact area in mechanically and optically contacted joints is, therefore, significantly reduced, which typically leads to increased temperatures and warpage. Bonded joints typically use organic adhesive which has a low thermal conductivity and, therefore, impedes effective heat transfer. In addition, bonded joints cause increased stresses in the transmissive optical component since its transverse thermal expansion is now constrained by attachment to a heat sink. Finally, heat conduction through narrow gas-filled gaps is rather limited even when gasses with high thermal conductivity are used. Because of the above limitations, there is a need for an improved method for cooling transmissive optical components in HAP lasers.

SUMMARY OF THE INVENTION

The present invention is directed to a heat sink assembly ideally suited for face cooling a optical transmissive component (TOC) receiving a laser beam in a high average power (HAP) laser system. The heat sink assembly enables cooling of the TOC without introducing temperature gradients along the TOC in a direction normal to the direction of propagation of the laser beam. The heat sink assembly of the present invention further accomplishes this without the need for physically bonding the TOC to the heat sink assembly.

The heat sink assembly includes a transparent heat conductor (THC) that has one face thereof held closely adjacent a face of the TOC such that a seal is formed between the two faces. The seal may be formed by an independent sealing member interposed between the two faces. In one preferred embodiment, the heat sink assembly includes a THC having an O-ring groove formed in a face portion thereof, while the THC comprises a disk having parallel planar faces, with at least one, and preferably both, of the surfaces being formed as optically flat surfaces.

The THC may also include an O-ring seated in the O-ring groove, and a vacuum pump-out groove formed in the same surface as the O-ring groove, and radially inwardly of the O-ring groove. The vacuum pump-out groove includes a channel that opens onto an exterior surface of the THC to enable a vacuum to be applied to the pump-out groove. The vacuum urges the TOC against the THC, thus compressing the O-ring to form a sealed cavity defined by the O-ring and the facing surfaces of the TOC and the THC. Advantageously, no bonding or adhesives are required to maintain the faces of the TOC and the THC in contact with one another; the pressure differential between the cavity and the ambient environment performs this "holding" function. The heat sink assembly also includes a heat sink member in thermal contact with a peripheral portion of the THC.

In operation, heat generated in the TOC by a laser beam is conductively transmitted to the THC via the above-described contact, and then to the heat sink member. Since no physical bonding of the facing surfaces of the TOC and THC is needed, there is no tendency for the heat sink to cause stresses in the TOC to develop by impeding its transverse thermal expansion during operation. Avoiding a mechanically formed thermal coupling between the facing surfaces eliminates the possibility of excessive warpage of the face of the TOC, during operation, from degrading the transfer of thermal energy from the TOC to the THC.

In one alternative preferred embodiment, the TOC is sandwiched between a pair of THCs. Each THC is otherwise constructed as described above. Face cooling of both opposing surfaces of the TOC can be accomplished.

In another alternative preferred embodiment, a plurality of TOCs are disposed adjacent one another, but separated by a plurality of THCs. Thus, each TOC is sandwiched between a pair of THC. Each THC is constructed as described above and includes an associated heat sink component. Face cooling is achieved on both opposing faces of every TOC.

In another alternative preferred embodiment, the TOC includes a reflective coating on the face in contact with the THC of the heat sink assembly. The THC can include a plurality of pump-out channels formed to open onto the face of the THC that faces the TOC. The THC can also incorporate the O-ring groove and O-ring as described previously. The pump-out channels are in communication with a portion that opens onto an exterior surface of the THC so that an external means can be used to form a pressure force for holding the TOC in intimate thermal contact with the THC. The pressure force is applied by the pressure differential between the ambient atmosphere and the coolant.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIGS. 3a and 3b illustrate side cross-sectional side and end views, respectively, of a first preferred embodiment of the heat sink assembly of the present invention;

FIG. 4 illustrates a side cross-sectional view of a second preferred embodiment of the heat sink assembly of FIG. 3 that achieves face cooling on both opposing faces of an optical element;

FIG. 5 illustrates a cross-sectional side view of a third alternative preferred embodiment of the heat sink assembly in which every optical element has both of its opposing faces cooled by a heat sink assembly;

FIG. 6 is a side cross-sectional view of a fourth alternative preferred embodiment in which the thermal heat conductor (THC) incorporates a heat exchanger having a coolant flowed through it for cooling an optical element that is held in close proximity to the THC by an external holding element.

DETAILED DESCRIPTION OF THE PREFERRED EMBODIMENTS

Figure 1:
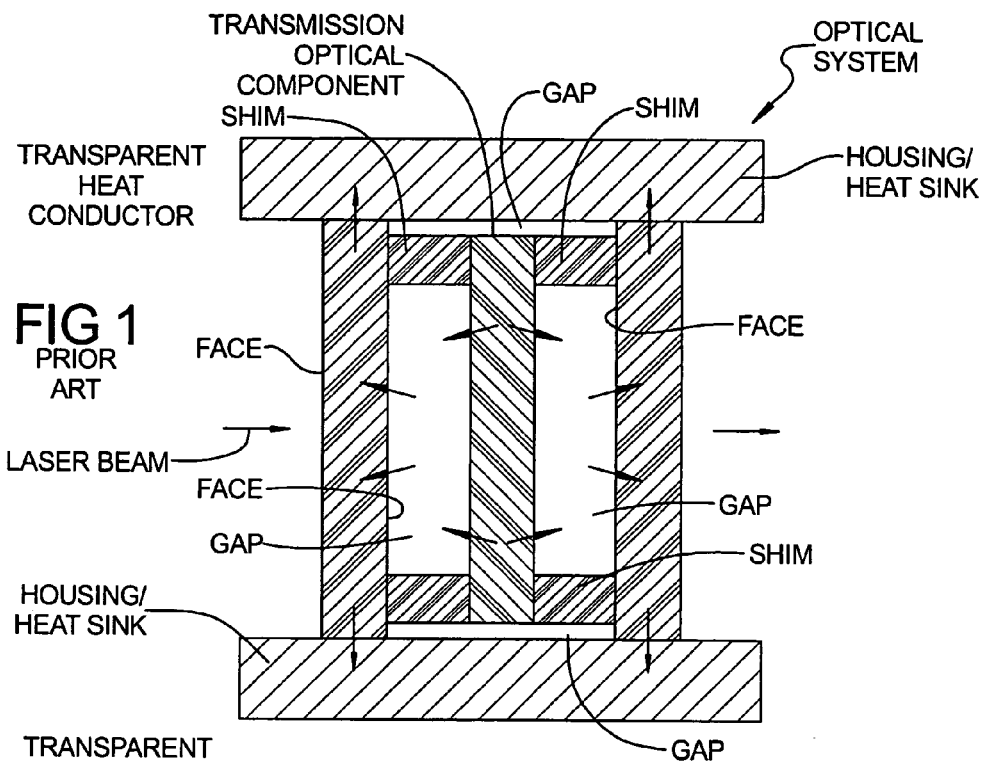
FIG. 1 is a diagram of a prior developed technique for passively removing heat from an optical element of a laser system.
Figure 2:
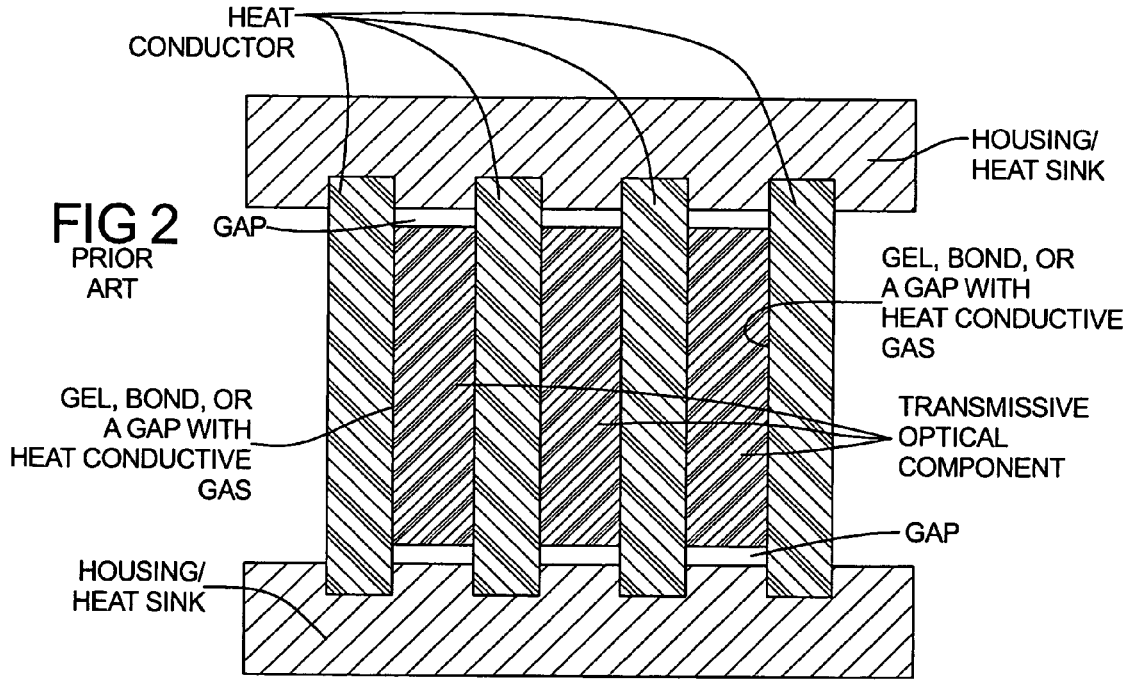
FIG. 2 is a diagram of a prior developed system that uses the cooling method of FIG. 1 with multiple, non-linear crystal formats.

The following description of the preferred embodiment(s) is merely exemplary in nature and is in no way intended to limit the invention, its application, or uses.

The invention discloses a method for cooling optical components of a high average power, solid state laser (HAPSSL), and thus increasing the power-handling capability of the optical components. The various preferred embodiments enable many tactical and strategic laser systems which would otherwise be too costly to manufacture.

Referring to FIGS. 3a and 3b, there is shown a cooled optical assembly 10 in accordance with a first preferred embodiment of the present invention comprising a transparent optical component (TOC) 22 and a heat sink assembly 48. The cooled optical assembly 10 receives an incident laser beam 26 and transmits it therethrough to form a laser beam 26'. The heat sink assembly 48 further comprises an optically transparent heat conductor (THC) 24 and a heat sink 28. The TOC 22 is a flat member made of suitable optically transparent material having two large and generally parallel surfaces. The perimeter of the TOC 22 is preferably circular, elliptical, oval or polygonal in shape. Large TOC surfaces 52 and 52' are adapted to receive and transmit laser beams and for this purpose can be equipped with appropriate optical coatings. In addition, surface 52' is machined to optical flatness and mated with THC surface 42.

The THC 24 is a flat member having two large and generally parallel surfaces. It is made of optical material having good thermal conductivity and is substantially transparent at the optical wavelengths of the laser beams 26 and 26'. Suitable materials for THC 24 include sapphire, single crystal diamond, polycrystalline diamond, yttrium aluminum garnet (YAG) in a single crystal or polycrystalline form, and gallium gadolinium garnet (GGG) in a single crystal or polycrystalline form. The perimeter of the THC 24 is preferably circular, elliptical, oval or polygonal in shape. At least some portions of the THC 24 perimeter are attached to and in thermal communication with the heat sink 28. Heat sink 28 provides both mechanical support and heat removal for THC 24. For the latter purpose, the heat sink 28 is cooled either by conduction or by convection. For example, a conductively cooled heat sink 28 can be thermally attached to a solid-state cooler operating in accordance with the Peltier effect. A convectively cooled heat sink 28 may, for example, include a liquid or gas-cooled heat exchanger.

The large THC surfaces 42 and 42' receive and transmit laser beams and, for this purpose, can be equipped with appropriate optical coatings. THC surface 42 includes an O-ring groove 46 and pump-out grove or channel 34. The pump-out groove 34 is connected to a vacuum pump using a pump-out hole 36. In addition, THC surface 42 is machined to optical flatness. The cooled optical assembly 10 is formed when the O-ring grove 46 in the heat sink assembly 48 is equipped with an appropriate vacuum-sealing O-ring 32, the THC surface 42 is mated with the TOC surface 52', and vacuum suction is applied to the pump-out hole 36 in the presence of atmosphere 38. The pressure differential between the pressure of atmosphere 38 and the reduced pressure in the pump-out groove 34 generated by the vacuum suction forces the TOC surface 52' and THC surface 42 to contact. Over time, gas molecules trapped between the surfaces 52' and 42 migrate to the pump-out groove 34 and are removed. As a result, good thermal communication is established between the TOC 22 and THC 24.

When the cooled optical assembly 10 is operated with laser beam 26 and waste heat is generated inside the TOC 22, this heat is conducted to the THC 24. During this process the temperature gradient inside the TOC 22 is very nearly parallel to the direction of the laser beam 26. This means that a given phase front of the laser beam exposes TOC 22 material of the same temperature. As a result, the TOC 22 does not perturb phase fronts of the laser beam 26. The pressure differential that clamps the TOC 22 on to THC 24 can be further increased if the cooled optical assembly 10 is operated in a pressure chamber and atmosphere 38 is at or above ambient atmospheric pressure. In particular, if the pressure of atmosphere 38 is substantially above ambient atmospheric pressure, the pump-out hole 36 can be connected to ambient atmosphere rather than a vacuum pump.

Referring now to FIG. 4, there is shown a cooled optical assembly 11 in accordance with a second preferred embodiment of the present invention comprising the transparent optical component (TOC) 22 and heat sink assemblies 48a and 48b. The transparent optical component (TOC) 22 is the same as practiced with the first preferred embodiment 10. The heat sink assembly 48a is the same as the heat sink assembly 48, and the heat sink assembly 48b is a mirror image of the heat sink assembly 48a. In contrast to the first embodiment 10 where only the surface 52' was cooled, in this preferred embodiment both TOC surfaces 52 and 52' are respectively cooled by the heat sink assemblies 48a and 48b. As in the first embodiment, thermal communication between the TOC 22 and the heat sink assemblies 48a and 48b is assured by hydrostatic pressure generated by the pressure differential between the atmosphere 38 and the reduced pressure in the pump-out groves 34.

Referring now to FIG. 5, there is shown a cooled optical assembly 12 in accordance with a third preferred embodiment comprising multiple transparent optical components (TOC) 22 and multiple heat sink assemblies 48 and 148. The heat sink assembly 148 is similar to the heat sink assembly 48, except that a THC 124 has two O-ring groves 46 with O-rings 32, and two pump-out grooves 34 formed on its opposing surfaces and formed as a T-shaped channel (when viewed end-wise). In addition, a pump-out hole 136 is connected to both opposing pump-out grooves 34. In this fashion the THC 124 can receive an TOC on each of its facial surfaces 142 and 142'.

Referring now to FIG. 6, there is shown a cooled optical assembly 13 in accordance with a fourth preferred embodiment comprising a TOC 222 attached to a heat exchanger assembly 272. The TOC 222 is similar to the TOC 22 except that the surface 252' facing the heat exchanger assembly 272 has a reflective coating 272a for high-reflectivity at the operating wavelengths of cooled optical assembly 13. The heat exchanger assembly 272 comprises a rigid body 288 having a surface 280 that includes interconnected microchannels 274, and a heat exchanger 276 machined or otherwise formed on one or more interior surfaces of the rigid body 288. Except for the microchannels 274 and an O-ring grove 346, the surface 280 is machined to substantially optical flatness. The rigid body 288 can be provided in two pieces to more easily permit the heat exchanger 276 to be formed, and then secured together such as by diffusion, bonding, brazing or any other suitable attachment means. The rigid body 288 is made of thermally conductive material preferably having a high Young's modulus and made sufficiently thick to have a high degree of mechanical rigidity. Preferred materials for the rigid body 288 include silicon, copper, copper alloys, tungsten, and tungsten carbide.

The cooled optical assembly 13 also includes a clamp 292 that gently presses the TOC 222 towards the surface 280, thereby squeezing the O-ring 232. When the pressure in the microchannels 274 is reduced below the pressure of atmosphere 38, the TOC 222 experiences a hydrostatic pressure forcing its reflectively coated surface 252' into contact with the surface 280, thereby establishing good thermal communication between the TOC 222 and the rigid body 288. Waste heat produced in the TOC 222 by the laser beam 26 is then conducted through the high-reflectivity optical coating 272a on the surface 252' into surface 280 of the rigid body 288. Preferably, the heat exchanger 276 is placed in close proximity to the microchannels 274, thereby reducing the thermal gradient inside the rigid body 288. The heat exchanger 276 is cooled by a coolant 282 entering the rigid body through a header 284 and drained through a header 286.

Figure 7:
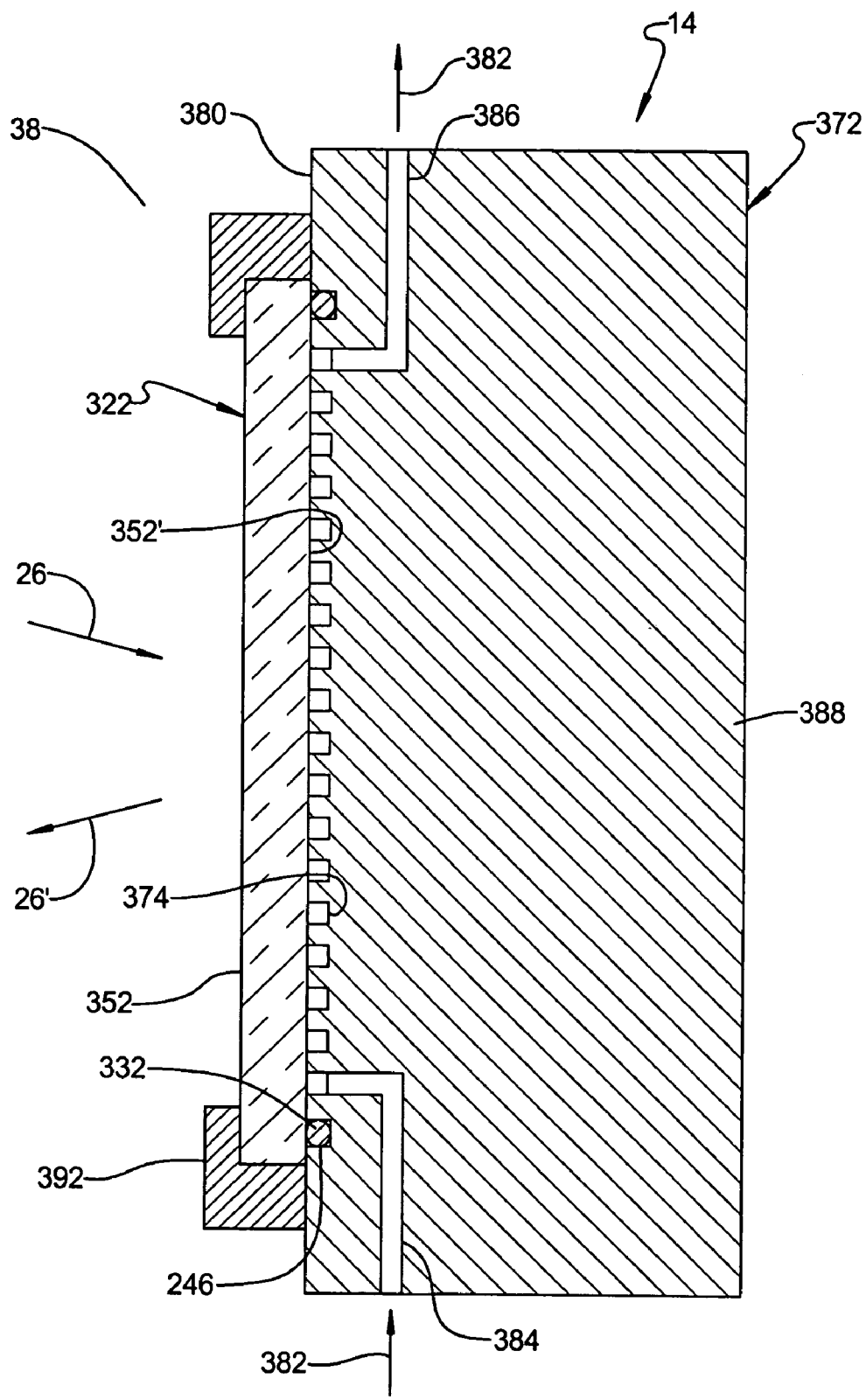
FIG. 7 is a side cross-sectional view of a fifth alternative preferred embodiment in which a coolant is flowed directly through microchannels formed in a thermal heat conductor (THC) for removing heat from an optical element held in close proximity to a face of the THC.

Referring now to FIG. 7, there is shown a cooled optical assembly 14 in accordance with a fifth preferred embodiment comprising a TOC 322 attached to a heat exchanger assembly 372. The TOC 322 is similar to the TOC 222 practiced with the fourth embodiment of the invention and common components in FIG. 7 are denoted by reference numerals increased by 100 over those used in FIG. 6. However, with optical assembly 14, microchannels 374 are formed to provide the heat exchanger, and a coolant 382 is now flowed directly through the microchannels 374. To assure positive attachment of the TOC 322 to the surface 380, the coolant pressure in the microchannels 274 is kept substantially lower than the pressure of atmosphere 38. The TOC 22 can be made of an optically active medium suitable for frequency doubling, amplification, or rotation of polarization. In testing, optical assembly 14, with a rigid body 388 made of silicon and a heat load of 18 watts/cm$^3$, maintained the TOC 322 flat to $\frac{1}{10}^{th}$ of an optical input waveform having a wavelength of 1.03 μm While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An optical assembly for use in a high average power laser system, comprising:
   a transparent optical component (TOC)
   a thermally conductive substrate having a face;
   said TOC and said thermally conductive substrate both being immersed in an atmosphere;
   an O-ring disposed between said TOC and said thermally conductive substrate, said O-ring being disposed in a groove formed in one of said TOC and said thermally conductive substrate;
   said face of said TOC being in contact with said face of said thermally conductive substrate thereby defining a contact area; at least a portion of said contact area being maintained at a reduced pressure within an area circumscribed by said O-ring, such that a pressure differential is created between said portion of said contact area and the atmosphere;
   said pressure differential adapted to compress said O-ring and to maintain a substantial portion of TOC face in a thermal contact with a substantial portion of said thermally conductive substrate face so that heat generated within the TOC can be transmitted by conduction into said thermally conductive substrate.

2. The optical assembly as in claim 1, wherein said TOC is adapted to receive and transmit a laser beam.

3. The optical assembly as in claim 2, wherein said TOC face is generally perpendicular to the direction of propagation of said laser beam.

4. The optical assembly as in claim 1, wherein said reduced pressure is provided by a vacuum pump.

5. The optical assembly as in claim 1, wherein said thermally conductive substrate is comprised of optically transparent material selected from the family of: sapphire, single crystal diamond, polycrystalline diamond, single crystal YAG, polycrystalline YAG, single crystal GGG, and polycrystalline GGG.

6. The optical assembly as in claim 1, further comprising a heat sink for removing heat from said thermally conductive substrate.

7. The optical assembly as in claim 1, further comprising a pair of thermally conductive substrates in contact with opposite faces of said TOC for drawing heat from opposing faces of said TOC.

8. The optical assembly of claim 1, further comprising a plurality of thermally conductive substrates separated by transparent optical components, and wherein each said thermally conductive substrate has a face in thermal contact with one of said transparent optical components.

9. The optical assembly as in claim 1, wherein said thermally conductive substrate is cooled by a coolant flow therethrough.

10. The optical assembly as in claim 9, wherein said thermally conductive substrate further includes microchannels on said portion of its said face which is maintained at a reduced pressure.

11. The optical assembly as in claim 10, wherein said coolant flows through said microchannels.

12. A heat sink system for use with a transparent optical component (TOC) of a high average power (HAP) laser system, the heat sink system comprising:
   a transparent heat conductor (THC) component having a planar face portion adapted to be held in proximity to a face of said TOC;
   said THC component including a groove within which is disposed a compressible sealing member on its said face portion, and a channel communicating between said face portion of said THC and a peripheral surface of said THC;
   a heat sink component in thermal contact with a peripheral portion of said THC; and
   a system for creating a pressure differential between said face portions of said TOC and said THC within an area circumscribed by said compressible sealing member, and an atmosphere acting on said TOC and said THC, thus urging said face of said TOC against face of said TOC with said compressible sealing member being compressed and captured therebetween; and
   wherein said THC convectively draws heat from said TOC, and said heat sink component draws heat from said THC to thus cool said TOC.

13. The system of claim 12, wherein said THC includes a pair of parallel, planar optically flat face portions.

14. The system of claim 12, wherein said THC includes an internal cavity and a heat exchanger disposed within said internal cavity.

15. The system of claim 14, wherein said internal cavity is in communication with a fluid inlet and a fluid outlet, each formed in said THC and each opening onto a peripheral surface of said THC.

16. The system of claim 12, further comprising an external clamp for holding said TOC against said sealing member.

17. The system of claim 12, wherein:
   said THC includes an O-ring groove formed in its said face portion; and
   said compressible sealing member comprises an O-ring disposed in said O-ring groove.

18. The system of claim 12, wherein said face portion includes a plurality of channels.

19. The system of claim 12, wherein such THC comprises at least one of: sapphire; single crystal diamond; polycrystalline diamond; yttrium aluminum garnet (YAG) in a single crystal or polycrystalline form; and gallium gadolinium garnet (GGG) in a single crystal or polycrystalline form.

20. A method for cooling a transparent optical component (TOC) of a high average power (HAP) laser system, the method comprising:
   placing a face portion of a transparent heat conductor (THC) in proximity to a face portion of said TOC;
   placing a O-ring within a groove formed in one of said face portions;

forming a pressure differential between said face portions within an area circumscribed by said O-ring, and an atmosphere acting on said TOC and said THC, to hold said face portions of said TOC and said THC against one another while compressing said sealing member; and using said THC to draw heat from said TOC.

21. The method of claim 20, further comprising:
using a heat sink component to draw heat from said THC.

22. The method of claim 20, further comprising using a heat exchanger formed in said THC to assist in removing heat from said THC.

23. The method of claim 20, further comprising using a clamp to hold said TOC face portion against a sealing member interposed between said faces.

* * * * *